(12) United States Patent
Holber et al.

(10) Patent No.: US 8,173,986 B2
(45) Date of Patent: May 8, 2012

(54) LASER-HEATED INFRARED SOURCE

(75) Inventors: William M. Holber, Winchester, MA (US); Donald K. Smith, Boston, MA (US); Stephen F. Horne, Somerville, MA (US); Matthew M. Besen, Andover, MA (US); Paul A. Blackborow, Cambridge, MA (US)

(73) Assignee: Energetiq Technology, Inc., Woburn, MA (US)

( * ) Notice: Subject to any disclaimer, the term of this patent is extended or adjusted under 35 U.S.C. 154(b) by 12 days.

(21) Appl. No.: 12/847,468

(22) Filed: Jul. 30, 2010

(65) Prior Publication Data

US 2011/0127450 A1    Jun. 2, 2011

Related U.S. Application Data

(60) Provisional application No. 61/229,840, filed on Jul. 30, 2009.

(51) Int. Cl.
 G01N 21/00    (2006.01)
 G01N 21/35    (2006.01)
 G01J 3/10    (2006.01)

(52) U.S. Cl. ............ 250/504 R; 250/495.1; 250/339.11; 250/338.1; 430/944

(58) Field of Classification Search .............. 250/504 R, 250/495.1, 339.11, 338.1; 430/944
See application file for complete search history.

(56) References Cited

U.S. PATENT DOCUMENTS 4,755,673 A * 7/1988 Pollack et al. ................ 250/330
7,018,751 B2 * 3/2006 Andrews et al. ................. 430/7

* cited by examiner

*Primary Examiner* — Nikita Wells
(74) *Attorney, Agent, or Firm* — Proskauer Rose LLP

(57) ABSTRACT

Described are infrared light sources and methods for generating infrared radiation. The infrared light source includes a source of laser radiation, a target and an enclosure. The target is positioned in a path of an output region of the source of laser radiation. The target includes an absorbing material that absorbs radiation at a wavelength within the lasing spectrum of the source of laser radiation and converts the absorbed radiation into thermal energy. The enclosure defines a cavity that includes the target. The enclosure includes an infrared reflecting film on a side that defines the cavity.

31 Claims, 4 Drawing Sheets

LASER-HEATED INFRARED SOURCE

RELATED APPLICATIONS

This application claims priority to and the benefit of U.S. Provisional Patent Application No. 61/229,840, filed on Jul. 30, 2009, the entire contents of which are incorporated herein by reference in its entirety.

FIELD OF THE INVENTION

The present invention relates generally to laser-heated infrared sources and methods for generating infrared radiation.

BACKGROUND OF THE INVENTION

Infrared radiation is typically characterized as the portion of the electromagnetic spectrum from 300 GHz to 400 THz. Many instruments and systems utilize an infrared (IR) light source. These include, for example, FTIR (Fourier Transform Infrared) spectroscopy systems and IR (Infrared) absorption systems. Applications for these instruments and systems include, for example, detecting trace quantities of hazardous substances, compositional measurements of various substances, obtaining information that leads to descriptions of properties (e.g., bonding) in various molecules, long-range measurements (including both integrated line measurements and point measurements at a distance) of potentially hazardous substances (e.g., biohazards, chemical hazards, pollutants, and irritants) in the atmosphere, and many applications in bioanalytical instrumentation, including FTIR microscopy.

Other applications for these instruments and systems also exist. For example, IR sources are used to calibrate instruments. For simpler temperature-measuring equipment, a conventional black-body source is used. However, for imaging IR systems, there is interest in having an array of IR emitters, where each emitter can be controlled independently of the others. Array's of IR emitters are typically implemented with an array of resistively-heated emitters. The temperature generated by resistively-heated emitters is typically limited to around 500 degrees Celsius. Resistively-heated emitters also have reliability issues and relatively slow time responses to achieve a desired temperature. Some users desire higher temperature capability than these emitters can provide—e.g., 1000 C or higher.

In cases where broadband IR light sources area needed (such as FTIR), heated elements are typically used. Numerous companies design and sell such elements, either by themselves or embedded into a larger piece of analytical instrumentation. Various materials are used for the heated elements, including tungsten, molybdenum, and silicon carbide. The materials used are typically electrically conductive and electricity is used to directly heat the element. While simple, inexpensive and compact, electrical heating of the elements limits the capability of the IR source. Furthermore, while heated-element IR sources are sometimes described in commercial literature as being capable of operating at temperatures up to approximately 1800 C, in fact, in real-world operation on analytical instrumentation, the temperature usually does not exceed about 1100-1300 C.

Several factors limit the maximum temperature at which conventional broadband IR sources may be operated. These factors include, for example, mechanical constraints (e.g., fatigue and stress where the electrical connections are made to the hot filament), heat loss through the electrical conductors, degradation of the source over time, and/or evaporation of the source over time. In some cases, another disadvantage of conventional IR sources is that as the source temperature is increased, the peak in the blackbody distribution shifts to shorter wavelengths, which is not where the radiated emission is most needed.

SUMMARY OF THE INVENTION

One approach to generating infrared radiation is to laser heat a target material. In one aspect, there is an infrared light source. The infrared light source includes a source of laser radiation, a target and an enclosure. The target is positioned in a path of an output region of the source of laser radiation. The target includes an absorbing material that absorbs radiation at a wavelength within the lasing spectrum of the source of laser radiation and converts the absorbed radiation into thermal energy. The enclosure defines a cavity that includes the target. The enclosure includes an infrared reflecting film on a side that defines the cavity.

In another aspect, there is a method for generating infrared radiation. The method includes generating a beam of laser radiation, absorbing at least a portion of the beam of laser radiation with a target material, converting, using the target material, the absorbed laser radiation into thermal energy, generating, using the target material, thermal radiation from the thermal energy, and reflecting, using an infrared reflecting film, at least a portion of the thermal radiation back onto the target material.

In other examples, any of the aspects above can include one or more of the following features. In some embodiments, the source of laser radiation can include one or more optic elements, one or more optical fibers, or any combination thereof. The source of laser radiation can include a laser. The laser can include a solid-state laser characterized by a lasing wavelength between 0.4 microns and 2 microns. The infrared light source further can include a wavelength-sensitive filter that passes infrared radiation and is positioned in a path of a radiation output region of the target. The infrared reflecting film can include a broadband reflecting film. A portion of the cavity can be in the shape of a cylinder, an ellipse, a parabola, a conic section, or any combination thereof. The cavity can include an open end. The wavelength-sensitive filter can be positioned near the open end. The enclosure can include the wavelength-sensitive filter and the cavity can be closed. The enclosure can include art inlet for a purge gas. The enclosure can be a vacuum enclosure.

In some embodiments, the absorbing and/or target material can include a conducting material, an insulating material, a semiconducting material, a semimetal material, or any combination thereof. The absorbing material can include tungsten (W), molybdenum (Mo), tantalum (Ta), silicon carbide (SiC), molybdenum disilicide ($MoSi_2$), molybdenum monoxide (MoO), calcium oxide (CaO), aluminum oxide ($Al_2O_3$), yttrium oxide ($Y_2O_3$), $Zr_2O_3$, carbon, graphite, diamond, MoO, CaO, $Y_2O_3$, $Zr_2O_3$, hafnium carbide (HfC), tantalum hafnium carbide ($Ta_4HfC_5$), or any combination thereof. The absorbing and/or target material can be in the form of a thin sheet, a sphere, a cube, a cylinder, a cone, a rectangular solid, or any combination thereof.

In some embodiments, the target material can be positioned in an enclosure defining a cavity. The enclosure can include a broadband reflecting film on a side that defines the cavity. A portion of the cavity can be in the shape of a cylinder, an ellipse, a parabola, a conic section, or any combination thereof. The cavity can include an open end. The method can further include directing at least an output portion of the thermal radiation to a wavelength-sensitive filter that passes infrared radiation. The wavelength-sensitive filter can be positioned near the open end. The enclosure can include the wavelength-sensitive filter and the cavity can be closed. The method can further include purging the cavity with a gas. The method can further include removing gas from the cavity to create a partial vacuum.

Any of the above implementations can realize one or more of the following advantages. The temperature of a laser-heated infrared source advantageously is not limited by mechanical constraints such as fatigue and stress of electrical connections. In addition, a laser-heated infrared source advantageously does not suffer from heat loss through electrical conductors. A laser-heated infrared source can also advantageously be used with insulators, semiconductors and semimetals in addition to conductor materials. Use of an inert gas or relative vacuum advantageously can prevent attack of the target by atmospheric gases (e.g., oxygen and/or water vapor). Use of laser wavelengths in the range of about 0.4 to 2 microns can take advantage of the numerous available choices of solid-state laser emitters in this wavelength region. Use of a broadband reflecting film in the cavity can advantageously increase the fraction of laser power absorbed into the target by reflecting part of incoming radiation onto the target and/or allowing some of the radiation produced by the heated target to be reabsorbed by the target. An increase in the fraction of laser power absorbed by the target can advantageously reduce the amount of laser energy required to heat the target to a particular temperature. Radiation that does not pass through the filter can be reflected back onto the target, advantageously reducing the amount of laser energy required to heat the target to a particular temperature.

The details of one or more examples are set forth in the accompanying drawings and the description below. Further features, aspects, and advantages of the invention will become apparent from the description, the drawings, and the claims. The drawings are not necessarily to scale, emphasis instead generally being placed upon illustrating the principles of the invention.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DESCRIPTION OF THE INVENTION

The invention, in one aspect, features a laser that is used to heat a material in order to raise its temperature to a desired operating point for use as, for example, an infrared (IR) light source. IR radiation can be produced by a laser-heated material as thermal radiation. The material to be heated is typically referred to as the target. The target can be chosen from a wide variety of materials, including, for example, conductors, insulators, semiconductors and semimetals. While electrical leads for resistively heating the target are not used in various embodiments of the invention, in some embodiments of the invention, electrical leads can be used to resistively heat the target in addition to laser heating the target.

In some embodiments, the target can operate in an ambient environment (e.g., room air). In alternative or supplemental embodiments, the target can be in an environment where it is either continually purged with a gas (e.g., an inert gas) or is inside a vessel which can either be evacuated of gas or pressurized with a gas (e.g., an inert gas). Use of an inert gas or relative vacuum advantageously can prevent attack of the target by atmospheric gases (e.g., oxygen and/or water vapor).

Figure 1:
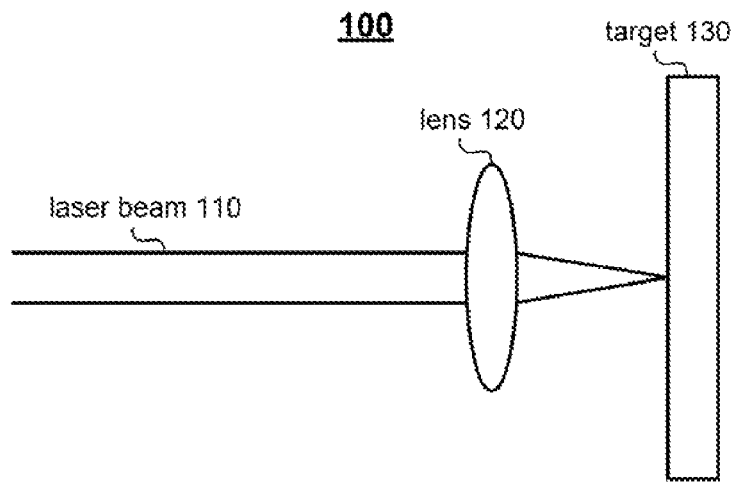
FIG. 1 is a block diagram showing a laser-heated infrared source, according to an illustrative embodiment of the invention.

FIG. 1 is a block diagram 100 showing a laser-heated infrared source, according to an illustrative embodiment of the invention, in which a source of laser radiation 110 is used to heat a target 130 positioned in a path of the laser radiation 110. The laser radiation 110 can include radiation at any wavelength where there will be at least some absorption by the material of the target 130. Wavelengths in the range of about 0.4 to 2 microns can advantageously be used due to the available choices of solid-state laser emitters in this wavelength region. The laser light 110 can be directed onto the target 130 directly from the laser by using one or more optic elements (e.g., lens 120) and/or through the use of an optical fiber (not shown). In alternative or supplemental embodiments, the laser radiation 110 can be collimated or divergent, and/or can issue from a fiber to the target 130.

Figure 2:
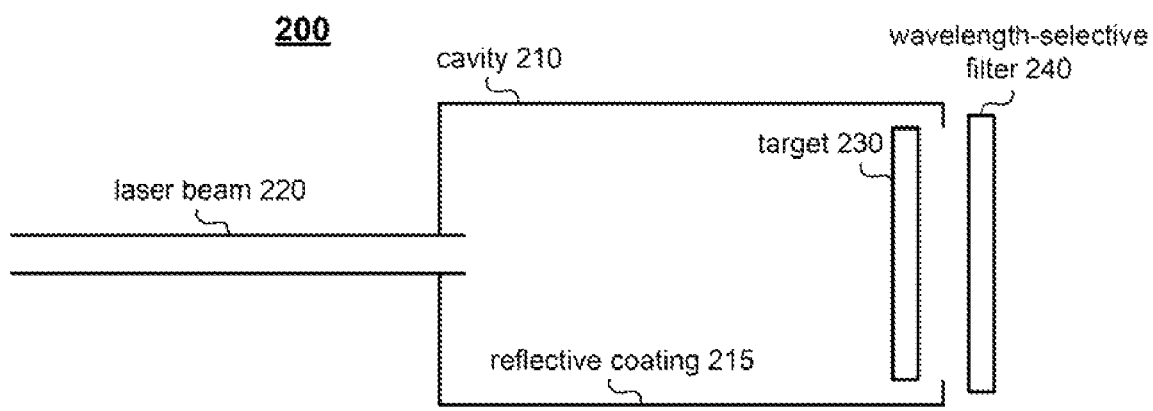
FIG. 2 is a block diagram showing a laser-heated infrared source, according to an illustrative embodiment of the invention.

FIG. 2 is a block diagram 200 showing a laser-heated infrared source, according to an illustrative embodiment of the invention, in which a target 230 is contained within a cavity 210 defined by an enclosure. In some embodiments, the boundaries of the cavity 210 can be cylindrical, elliptical, parabolic, combinations of conic shapes, or any combination thereof. The cavity 210 can be a closed chamber or an open chamber. A laser beam 220 can be fed into the cavity 210. The laser radiation 220 can be directed onto the target 230 directly from the laser by using one or more optic elements and/or through the use of an optical fiber (not shown). The inner walls of the cavity 210 can be coated with a broadband reflecting film 215, which reflects both the laser radiation 220, and/or laser radiation scattered off the surface of the target 230, and radiation produced by the heated target material. In alternative embodiments, the reflecting film 215 reflects radiation at least within the infrared spectrum (e.g., thermal radiation produced by the target 230). The broadband reflecting film 215 can advantageously increase the fraction of laser power absorbed into the target 230 by reflecting part of incoming radiation 220 onto the target 230 and/or allowing some of the radiation produced by the heated target 230 to be reabsorbed by the target 230. An increase in the fraction of laser power absorbed by the target 230 can advantageously reduce the amount of laser energy required to heat the target 230 to a particular temperature. An example of a typical broadband coating that might be used is gold.

In some embodiments, a wavelength-selective transmissive filter 240 can be positioned at an open end of the cavity and used to allow radiation out of the cavity 210 in only selected wavelength bands (e.g., one or more IR bands). The radiation that does not pass through the filter 240 can be reflected back onto the target 230, advantageously reducing the amount of laser energy required to heat the target 230 to a particular temperature. In some embodiments, the cavity 210 can be cooled. For example, ambient air can be used to passively cool the cavity 210 and/or forced air or water cooling can be actively used to cool the cavity 210.

Figure 3:
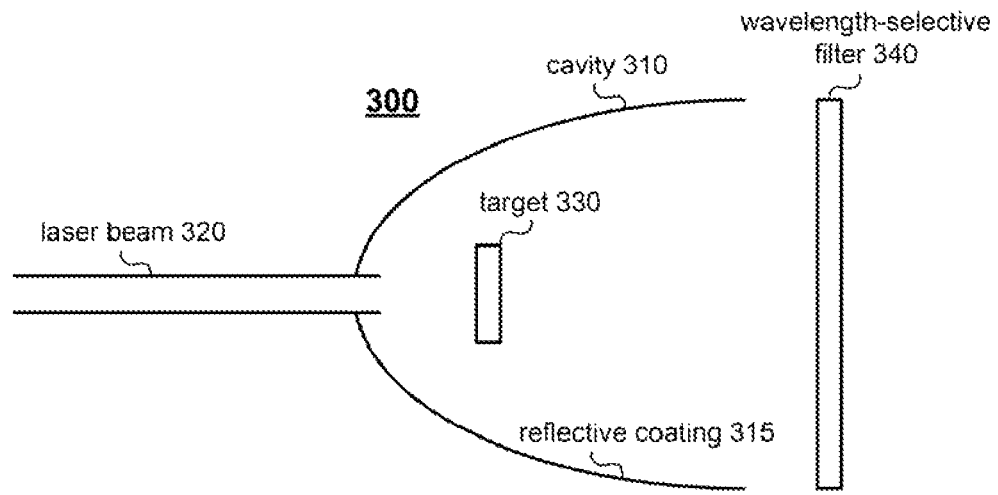
FIG. 3 is a block diagram showing a laser-heated infrared source, according to an illustrative embodiment of the invention.

FIG. 3 is a block diagram 300 showing a laser-heated infrared source, according to an illustrative embodiment of the invention, in which a target 340 is contained within a cavity 310. In some embodiments, the boundaries of the cavity 310 be in an elliptical shape, a parabolic shape, shapes of other conic sections, and/or shapes of portions of conic sections. A laser beam 320 can be fed into the cavity 310. The laser radiation 320 can be directed onto the target 330 directly from the laser by using one or more optic elements and/or through the use of an optical fiber (not shown). The inner walls of the cavity 310 can be coated with a broadband reflecting film 315. The broadband reflecting film 315 can share the same characteristics of the broadband reflecting film 215 illustrated in FIG. 2.

In some embodiments, a wavelength-selective transmissive filter 340 can be positioned near the open end of the cavity 310 and used to allow radiation to pass out of the cavity 210 in only selected wavelength bands (e.g., one or more IR bands). The filter 340 can share the same characteristics of the filter 240 illustrated in FIG. 2.

Figure 4:
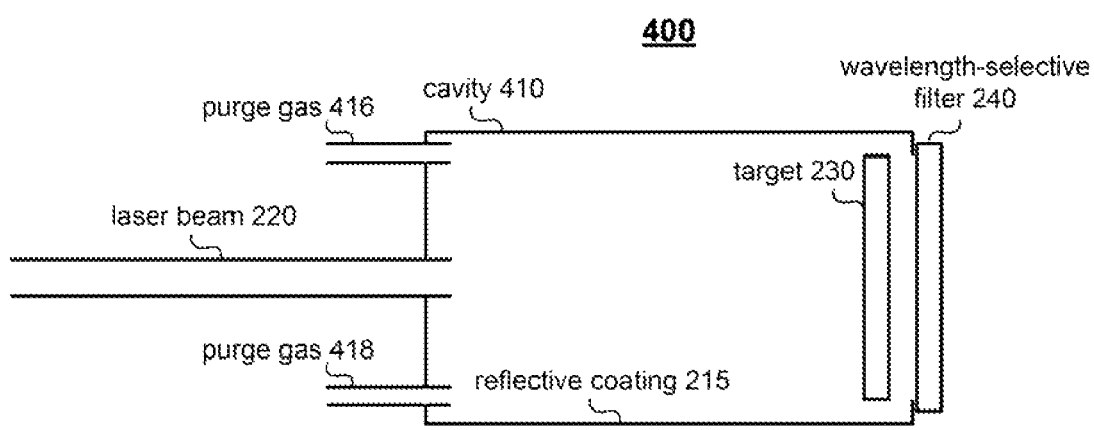
FIG. 4 is a block diagram showing a laser-heated infrared source, according to an illustrative embodiment of the invention.

FIG. 4 is a block diagram 400 showing a laser-heated infrared source, according to an illustrative embodiment of the invention, in which the target 230 is contained within a closed cavity 410. The cavity 410 can share the same characteristics of the cavity 210 illustrated in FIG. 2, but the cavity 410 is configured with one or more openings 416 and 418 that can be used to purge the cavity 410 with an inert gas to prevent degradation of the heated target 230 when exposed to air, or openings 416 and/or 418 can be coupled to vacuum pumps. Purge gas can be flowed continuously and/or the cavity 410 can be sealed after being filled with the purge gas. In the diagram 400, the enclosure of the cavity 410 includes the wavelength-selective transmissive filter 240. In alternative or supplemental embodiments, the filter 240 can be positioned next to a window of the enclosure defining the cavity 410.

In some embodiments, the targets 130, 230, 330 can be formed in a manner that facilitates mechanically mounting the targets 130, 230, 330 in a laser-heated IR source, while minimizing the amount of heat lost via the mechanical mounting points. For example, in some embodiments, certain areas of a target can be thinned to reduce the target's thermal conductivity in those areas. In alternative or supplemental embodiments, certain areas of a target in physical contact with a mounting point can be machined to reduce thermal conduction via the mounting points. As an example, laser cutting can be used to cut features into thin ceramic elements.

Figure 5:
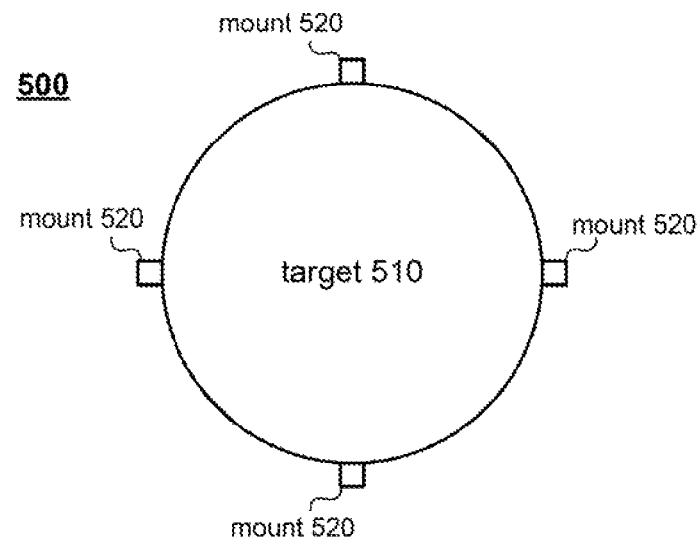
FIG. 5 is a block diagram showing a laser-heated target, according to an illustrative embodiment of the invention.

FIG. 5 is a block diagram 500 showing a laser-heated target 510, according to an illustrative embodiment of the invention. The target 500 can be cut and/or machined to a shape such that it is mechanically held while minimizing thermal losses via the mechanical mounting elements 520. In this example, a thin ceramic element is cut so that the mounting points will not cause significant thermal loss. A laser cutting technique and/or other material processing or machining technique can be used.

In some embodiments, the target can be shaped and/or treated to maximize absorption of laser radiation. For example, the surface of a target can be roughened and/or the target is produced with a preferred shape. The surface where laser radiation is incident can be formed in the shape of a cone, so that the laser will undergo multiple reflections and thus have greater absorption. The thickness of a target can also be chosen so as to maximize the laser absorption. In alternative or supplemental embodiments, multiple materials can be deposited on and/or otherwise attached to a target in order to allow for better absorption of laser radiation and/or more desirable emissivity characteristics. For example, a thin layer of tungsten, carbon, and/or silicon carbide can be deposited on one or both sides of a target to produce desirable emissivity characteristics.

Targets can also have their surfaces altered in order to change their emissivity in specific wavelength bands. For example, a target can be formed that has high emissivity at the wavelength of the pump laser, and lower emissivity in other wavelength bands. As another example, a target can be formed that has high emissivity at longer infrared wavelengths and lower emissivity at shorter wavelengths (e.g., from visible to near infrared). The emissivity of the surface can also be altered such that certain parts of the surface have different emissivity characteristics than other parts of the surface. In general, emissivity can be altered through compositional control of the material, surface texturing, and/or patterning of structures on the surface of the target with, for example, gratings and/or other periodic patterns.

In some embodiments where target materials have temperature-dependent emissivity characteristics, laser absorption can result in significant hysteresis with respect to incident laser power. For example, if laser absorption of the target material is low at lower temperatures but high at higher temperatures, laser power can initially be applied at high laser power. As the target begins to rise in temperature, laser absorption will increase and the incident laser power applied to the target can be lowered to a stable operating point. As an alternative, a non-laser heating method (e.g., electrical heating) can be used in order to bring the target temperature to a point where significant laser absorption will occur. In supplemental or alternative embodiments, laser power can be time-modulated, either fully or partially, in order to generate a time-modulated spectral output.

In some embodiments, a laser can be used to raster across a sheet of target material, in order to generate a 2-dimensional IR pattern. Applications for this method include creating an IR image for calibration of imaging IR arrays. Applications also include generating test images for calibrating hyperspectral imaging systems operating in the visible to IR spectral region. The temperature attainable for individual points on the sheet of heatable target material can exceed 1000 C, presently unattainable in any practical way by other means. Time response can be quite fast, depending on choice of target material and geometry. The laser can be time-modulated in its output, in addition to being rastered across the surface. In some embodiments, the heatable target material sample can be rastered and/or otherwise moved in front of the laser, leaving the laser and its optics fixed.

Figure 6:
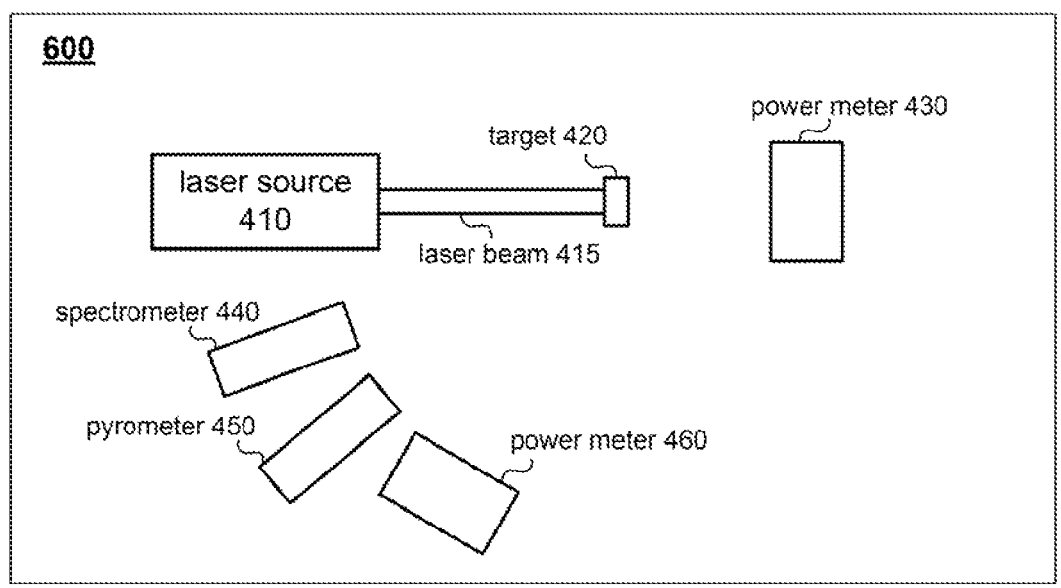
FIG. 6 is a block diagram showing a laser-heated infrared measurement system, according to an illustrative embodiment of the invention.

FIG. 6 is a block diagram showing a laser-heated infrared measurement system 600, illustrated an experimental arrangement used to measure the temperature and radiated power from a target. The laser source 410 includes a 60 W (maximum power) diode laser at 940 nm wavelength, which outputs radiation coupled through a fiber to a collimator. The resultant collimated laser beam 415 is used to heat the target 420. Two thermopile-type power meters 430 and 460 measure both the transmitted and reflected laser power, respectively, and also the radiated light from the heated sample. The thermopiles 430 and 460 can also be equipped with filters so that the laser light can be differentiated from the radiated light produced by the heated target. A standard single-wavelength pyrometer 450 and a UV-VIS-NIR spectrometer 440 provide independent measures of the sample temperature.

Figure 7:
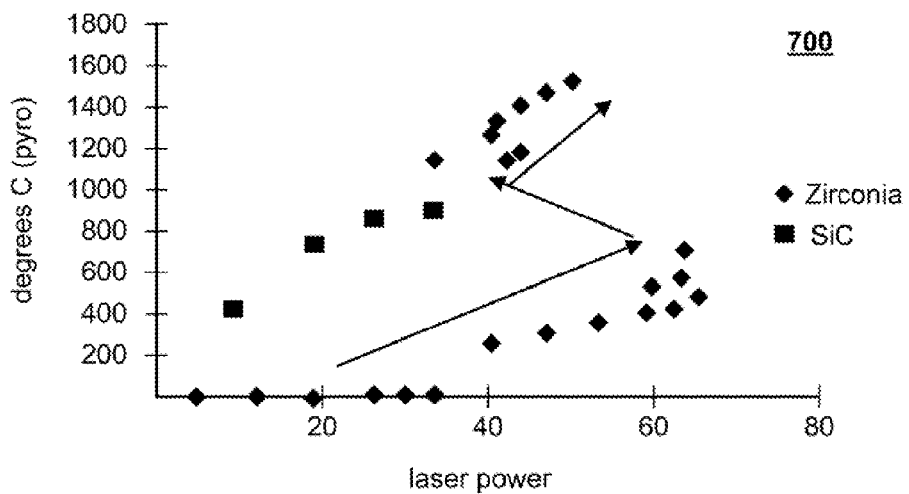
FIG. 7 shows a two-dimensional plot of measured temperature of SiC and $Zr_2O_3$ targets versus laser power.

FIG. 7 shows a two-dimensional plot 700 of measured temperatures of laser-heated SiC and $Zr_2O_3$ targets versus laser power as measured in system 600. The SiC target displays no hysteresis in heating, since the emissivity at the laser wavelength is high at all temperatures. For the $Zr_2O_3$ sample, however, significant hysteresis resulted with respect to measured temperature as a function of laser power. This is due to the fact that at lower temperatures, the emissivity of the target at the laser wavelength is fairly low, increasing as the temperature increases.

Figures 8A, 8B:
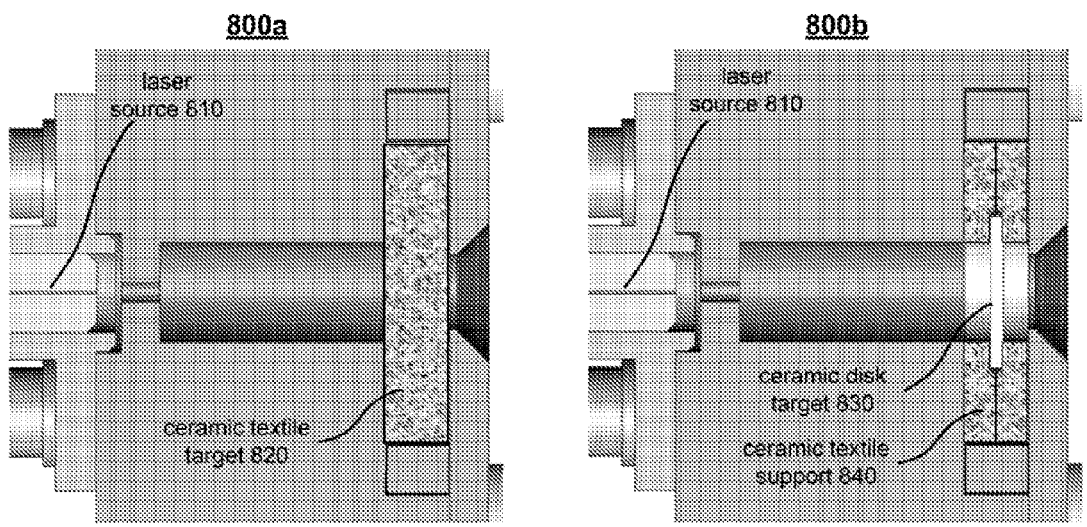
FIGS. 8A-8B are block diagrams showing laser-heated targets, according to illustrative embodiments of the invention.

FIGS. 8A-8B are block diagrams 800a-b showing laser-heated targets, according to illustrative embodiments of the invention. In FIG. 8A, a laser source 810 is directed to a ceramic textile target 820. In FIG. 8B, a laser source 810 is directed to a ceramic disk target 830 that is supported by a ceramic textile support 840. In some embodiments, a ceramic textile can be woven (e.g., cloth) or non-woven (e.g., felt). Ceramic textiles can advantageously provide low thermal conductivity and/or high thermal shock resistance. In addition, ceramic textiles can provide high radiant emissivity due to their highly textured surface.

In some embodiments, an IR laser-driven plasma lamp can be constructed. The lamp can include a sealed envelope containing a gas and an appropriate infrared-transmitting window. Appropriate window materials include, for example, sapphire, magnesium fluoride, calcium fluoride, zinc selenide, silicon and germanium. The gas or gases filling the lamp can be chosen so as to optimize output from specific portions of the spectrum. Xenon is a gas commonly used for UV-VIS short arc lamps. At higher operating pressures (several atmosphere and higher) its output tends to be continuous rather than dominated by line-structure, which can be advantageous for some applications. Other gases and other pressures can result in different spectral output characteristics. A laser-driven IR plasma lamp can have an effective temperature in the discharge of 5000-20,000 degrees Celsius, far more than is otherwise attainable by heating a solid material.

In some embodiments, anon-sealed lamp can be used, in which a continuously flowing gas is used in place of a static gas fill inside of a sealed bulb envelope. This would have the advantage of not requiring any optical window at all, thereby reducing complexity and cost and allowing a wider range of light to be coupled out of the lamp. In some embodiments, the purge gas is at atmospheric pressure and the laser-driven discharge is created in the purge gas. In addition, the pressure in the lamp can be kept at several atmospheres or greater, by using appropriate apertures to create a pressure gradient. The output of the IR laser-driven lamp can be modulated in time by modulation of the drive laser.

Target materials can include, for example, tungsten (W), molybdenum (Mo), tantalum (Ta), silicon carbide (SiC), molybdenum disilicide ($MoSi_2$), molybdenum monoxide (MoO), calcium oxide (CaO), aluminum oxide ($Al_2O_3$), yttrium oxide ($Y_2O_3$), $Zr_2O_3$, carbon, graphite, diamond, or any combination thereof.

Laser heating a target material can be advantageous when an insulating material is used as the target, because simple resistive heating of the insulating material is not possible. Examples of such materials include, for example, MoO, CaO, $Y_2O_3$, and $Zr_2O_3$, all of which have melting points above 2000 C.

For even higher temperature operation, carbide-based materials can be used. Examples of carbide-based materials include hafnium carbide (HfC), which has a melting point of approximately 3890 C, and tantalum hafnium carbide ($Ta_4HfC_5$), which has a melting point of approximately 3547 C. In some embodiments, the carbide-based materials can be used as target materials in either an inert gas or vacuum environment to advantageously prevent attack by oxygen and other gases at high temperatures.

Various shapes and sizes of target material can be used in various embodiments of the invention. In some embodiments, the target material can be in the form of a thin sheet, so as to advantageously minimize thermal conduction away from the heated spot. In alternative or supplemental embodiments, the target can include a high-temperature thermal foam that has the characteristic of very low thermal conductivity. In alternative or supplemental embodiments, the target can be in the form of a sphere, cube, cylinder, cone, rectangular solid, any combination thereof, or other suitable shape.

Applications of a laser-heated IR source include, for example, an IR source for instrumentation and/or an IR source in infrared countermeasures (e.g. to jam the IR sensors of missiles).

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed:

1. An infrared light source comprising:
   a source of laser radiation;
   a target positioned in a path of an output region of the source of laser radiation, the target including an absorbing material that absorbs radiation at a wavelength within the lasing spectrum of the source of laser radiation and converts the absorbed radiation into thermal energy; and
   an enclosure defining a cavity that includes the target, the enclosure including an infrared reflecting film on a side that defines the cavity.

2. The infrared light source of claim 1 wherein the source of laser radiation comprises one or more optic elements, one or more optical fibers, or any combination thereof.

3. The infrared light source of claim 1 wherein the source of laser radiation comprises a laser.

4. The infrared light source of claim 1 wherein the laser comprises a solid-state laser characterized by a lasing wavelength between 0.4 microns and 2 microns.

5. The infrared light source of claim 1 further comprising a wavelength-sensitive filter that passes infrared radiation, the wavelength-sensitive filter positioned in a path of a radiation output region of the target.

6. The infrared light source of claim 1 wherein the infrared reflecting film comprises a broadband reflecting film.

7. The infrared light source of claim 1 wherein a portion of the cavity is in the shape of a cylinder, an ellipse, a parabola, a conic section, or any combination thereof.

8. The infrared light source of claim 1 wherein the cavity includes an open end, and the wavelength-sensitive filter is positioned near the open end.

9. The infrared light source of claim 1 wherein the enclosure includes the wavelength-sensitive filter and the cavity is closed.

10. The infrared light source of claim 9 wherein the enclosure includes an inlet for a purge gas.

11. The infrared light source of claim 9 wherein the enclosure is a vacuum enclosure.

12. The infrared light source of claim 1 wherein the absorbing material comprises a conducting material, an insulating material, a semiconducting material, a semimetal material, or any combination thereof.

13. The infrared light source of claim 12 wherein the absorbing material comprises tungsten (W), molybdenum (Mo), tantalum (Ta), silicon carbide (SiC), molybdenum disilicide ($MoSi_2$), molybdenum monoxide (MoO), calcium oxide (CaO), aluminum oxide ($Al_2O_3$), yttrium oxide ($Y_2O_3$), $Zr_2O_3$, carbon, graphite, diamond, or any combination thereof.

14. The infrared light source of claim 12 wherein the absorbing material comprises MoO, CaO, $Y_2O_3$, $Zr_2O_3$, or any combination thereof.

15. The infrared light source of claim 12 wherein the absorbing material comprises hafnium carbide (HfC), tantalum hafnium carbide ($Ta_4HfC_5$), or any combination thereof.

16. The infrared light source of claim 1 wherein the absorbing material is in the form of a thin sheet, a sphere, a cube, a cylinder, a cone, a rectangular solid, or any combination thereof.

17. A method of generating infrared radiation, the method comprising:
   generating a beam of laser radiation;
   absorbing at least a portion of the beam of laser radiation with a target material;
   converting, using the target material, the absorbed laser radiation into thermal enemy;
   generating, using the target material, thermal radiation from the thermal energy; and
   reflecting, using an infrared reflecting film, at least a portion of the thermal radiation back onto the target material.

18. The method of claim 17 wherein the beam of laser radiation is characterized by a wavelength between 0.4 microns and 2 microns.

19. The method of claim 17 wherein the target material is positioned in an enclosure defining a cavity.

20. The method of claim 19 wherein the enclosure includes the infrared reflecting film on a side that defines the cavity.

21. The method of claim 19 wherein a portion of the cavity is in the shape of a cylinder, an ellipse, a parabola, a conic section, or any combination thereof.

22. The method of claim 19 wherein the cavity includes an open end, and the wavelength-sensitive filter is positioned near the open end.

23. The method of claim 19 further comprising directing at least an output portion of the thermal radiation to a wavelength-sensitive filter that passes infrared radiation.

24. The method of claim 23 wherein the enclosure includes the wavelength-sensitive filter and the cavity is closed.

25. The method of claim 23 further comprising purging the cavity with a gas.

26. The method of claim 23 further comprising removing gas from the cavity to create a partial vacuum.

27. The method of claim 17 wherein the target material comprises a conducting material, an insulating material, a semiconducting material, a semimetal material, or any combination thereof.

28. The method of claim 27 wherein the target material comprises tungsten (W), molybdenum (Mo), tantalum (Ta), silicon carbide (SiC), molybdenum disilicide ($MoSi_2$), molybdenum monoxide (MoO), calcium oxide (CaO), aluminum oxide ($Al_2O_3$), yttrium oxide ($Y_2O_3$), $Zr_2O_3$, carbon, graphite, diamond, or any combination thereof.

29. The method of claim 27 wherein the target material comprises MoO, CaO, $Y_2O_3$, $Zr_2O_3$, or any combination thereof.

30. The method of claim 27 wherein the target material comprises hafnium carbide (HfC), tantalum hafnium carbide ($Ta_4HfC_5$), or any combination thereof.

31. The method of claim 17 wherein the target material is in the form of a thin sheet, a sphere, a cube, a cylinder, a cone, a rectangular solid, or any combination thereof.

* * * * *